United States Patent [19]

Shinto et al.

[11] Patent Number: 4,995,638

[45] Date of Patent: Feb. 26, 1991

[54] AIR BAG COVER

[75] Inventors: Hiroaki Shinto, Toyota; Sumio Sakaguchi, Nagoya; Katuki Asagiri, Niwa, all of Japan

[73] Assignees: Toyota Jidosha Kabushiki Kaisha, Toyota; Kabushiki Kaisha Tokai-Rika-Denki-Seisakusho, Niwa, both of Japan

[21] Appl. No.: 459,272

[22] Filed: Dec. 29, 1989

[30] Foreign Application Priority Data

Dec. 29, 1988 [JP] Japan ............................ 63-170792[U]

[51] Int. Cl.⁵ ................................................ B60R 21/16
[52] U.S. Cl. .................................... 280/731; 280/743
[58] Field of Search ......................... 280/731, 732, 743

[56] References Cited

U.S. PATENT DOCUMENTS

| | | | |
|---|---|---|---|
| 3,907,330 | 9/1975 | Kondo et al. | 280/731 |
| 4,752,083 | 6/1988 | Honda | 280/731 |
| 4,852,907 | 8/1989 | Shiraki et al. | 280/731 |
| 4,878,689 | 11/1989 | Mitzkus et al. | 280/731 |

FOREIGN PATENT DOCUMENTS

50-136135  4/1975  Japan .
50-127336  10/1975  Japan .
51-1932  6/1976  Japan .
58-49887  11/1983  Japan .
63-184548  7/1988  Japan .
63-184549  7/1988  Japan .

*Primary Examiner*—Kenneth R. Rice
*Attorney, Agent, or Firm*—Cushman, Darby & Cushman

[57] ABSTRACT

An air bag cover for covering an air bag in a folded state, the air bag being adapted to expand in front of a seat occupant at a sudden deceleration of the vehicle speed. The air bag cover includes a first thin-wall portion which is first broken by the expanding pressure at the time of the inflation of the air bag and a second thin-wall portion which is broken after the breakage of the first thin-walled portion has advanced. The first thin-walled portion and the second thin-walled portion are connected to each other in such a manner as to be substantially perpendicular to each other. A connecting portion between the two thin-walled portions has an even smaller thickness than the thicknesses of the two thin-walled portions, thereby permitting the breakage of the first thin-walled portion to advance smoothly to the second thin-walled portion.

20 Claims, 8 Drawing Sheets

AIR BAG COVER

BACKGROUND OF THE INVENTION

1. Field of the Invention

The present invention relates to an air bag cover for an air bag apparatus installed on a vehicle or the like.

2. Background Information

An air bag apparatus, which is assembled to a steering wheel, an instrument panel, qr the like, is so designed that an air bag is inflated with a gas to expand toward an occupant of the vehicle in the event of a head on collision of the vehicle so as to prevent the forward movement of the occupant, thereby ensuring the safety of the occupant.

The air bag apparatus is provided with an air bag cover which conceals and protects the air bag and the like. Known air bag covers are so constructed that, in the event of a collision of the vehicle, a linear thin-walled portion is broken by being pressed from inside by the air bag which is inflated at that time, allowing the air bag to protrude from an opening thereby formed (Japanese Patent Laid-Open No. 127336/1975 and Japanese Utility Model Publication No. 49887/1983).

Figure 8:
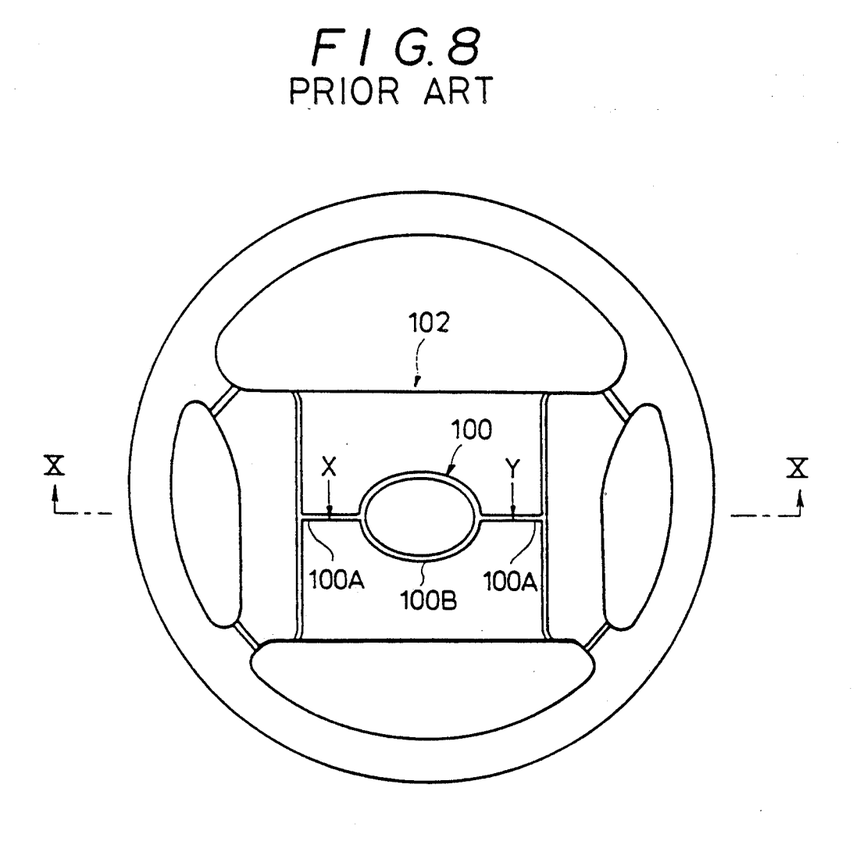
FIG. 8 is a front elevational view illustrating a steering wheel with a conventional air bag cover mounted thereon.

However, in order to enhance its outward appearance in design, an air bag cover has in recent years come to be provided with a thin-walled portion which is not composed of one rectilinear groove portion, but, as shown in FIG. 8, there has been proposed an air bag cover 102 provided with an attractive thin-walled portion 100 which is formed by combining a pair of rectilinear horizontal groove portions 100A and a loop-shaped groove portion 100B.

Figure 10:
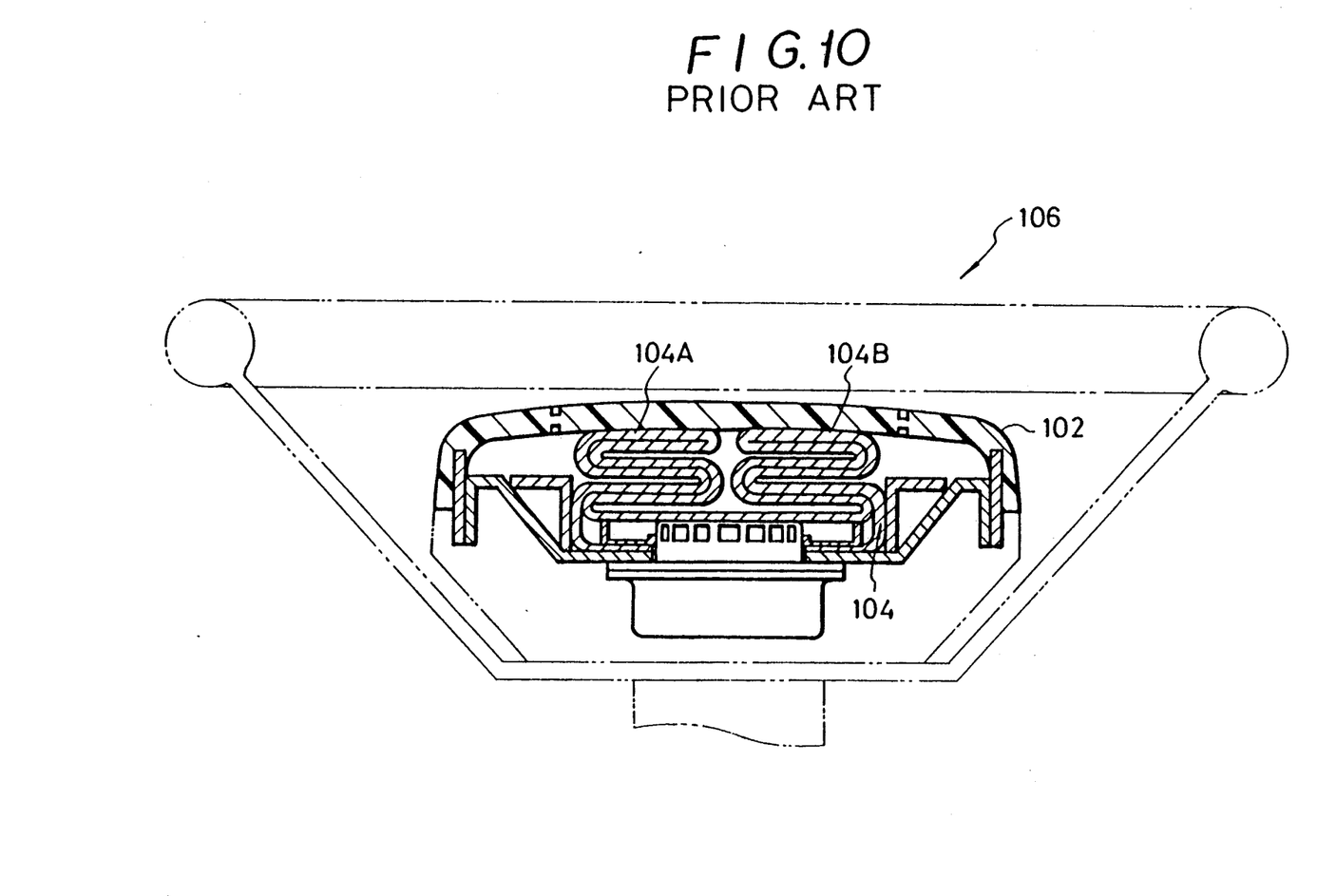
FIG. 10 is a cross-sectional view of an air bag apparatus, corresponding to a cross sectional taken along the line X—X of FIG. 8.

However, in an air bag apparatus 106 shown in FIG. 10 in which an air bag 104 for pressing an air bag cover 102 is accommodated in a folded state as illustrated, at the time when the air bag 104 is inflated, those peripheral portions 104A, 104B of the air bag 104 that are located most closely to the air bag cover 102 first press intermediate portions (portions X and Y and their vicinity in FIG. 8) of the horizontal groove portions 100A of the air bag cover 102. Consequently, maximum strains occur at the intermediate portions of the horizontal groove portions 100A, so that breakage commences at these intermediate portions of the horizontal groove portions 100A.

Figure 9:
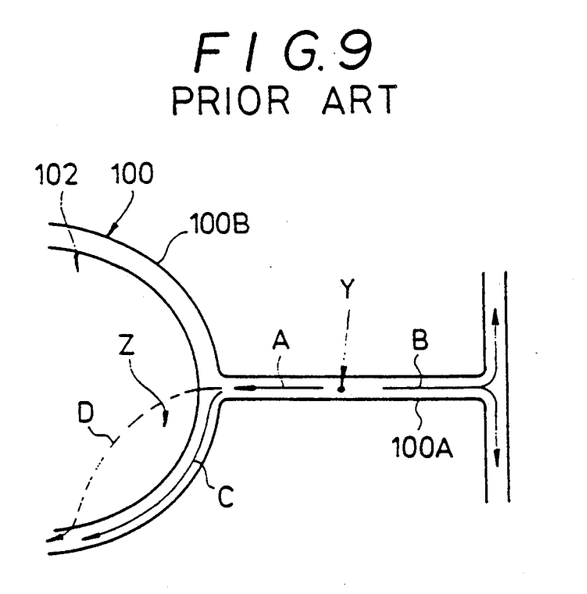
FIG. 9 is a partial enlarged view of FIG. 8.

Such being the case, if a right-hand portion (the right-hand side in FIG. 8) of the air bag cover 102 is taken up as an example, as shown in FIG. 9, the breakage which has occurred at the portion Y which is an intermediate portion of the horizontal groove portion 100A advances as indicated by arrows A and B. However, at a point of intersection between the rectilinear horizontal groove portion 100A and the curvilinear groove portion 100B, the direction of breakage is bifurcated into two directions, one heading in the direction of arrow C and the other heading in the direction of arrow D. Consequently, there is the possibility that a portion Z of the air bag cover 102 surrounded by arrow C and arrow D may be torn off and scattered.

SUMMARY OF THE INVENTION

Accordingly, an object of the present invention is to provide an air bag cover which opens only along a first thin-walled portion and a second thin-walled portion formed in the air bag cover when an air bag is inflated, thereby overcoming the above-described drawback of the conventional art.

To this end, in accordance with the present invention, there is provided an air bag cover having a cover body in which a first thin-walled portion and a second thin-walled portion connected thereto are formed. These two thin-walled portions are provided with thin widths, and the second thin-walled portion in its longitudinal direction is curved. The thickness of a connecting portion between the first thin-walled portion and the second thin-walled portion is made smaller than the thicknesses of the first and second thin walled portions. Consequently, after the first thin-walled portion is broken by the expansion of the air bag, the breakage is positively transmitted to the second thin-walled portion along the connecting portion. The connecting portion may break before the breakage of the first and second thin-walled portions due to the expansion of the air bag. In this case, the first and second thin-walled portions subsequently undergo breakage positively along them. Each of these thin-walled portions can be formed by providing a pair of grooves, respectively, in the obverse and reverse surfaces of the cover body.

DESCRIPTION OF THE PREFERRED EMBODIMENT

Figure 6:
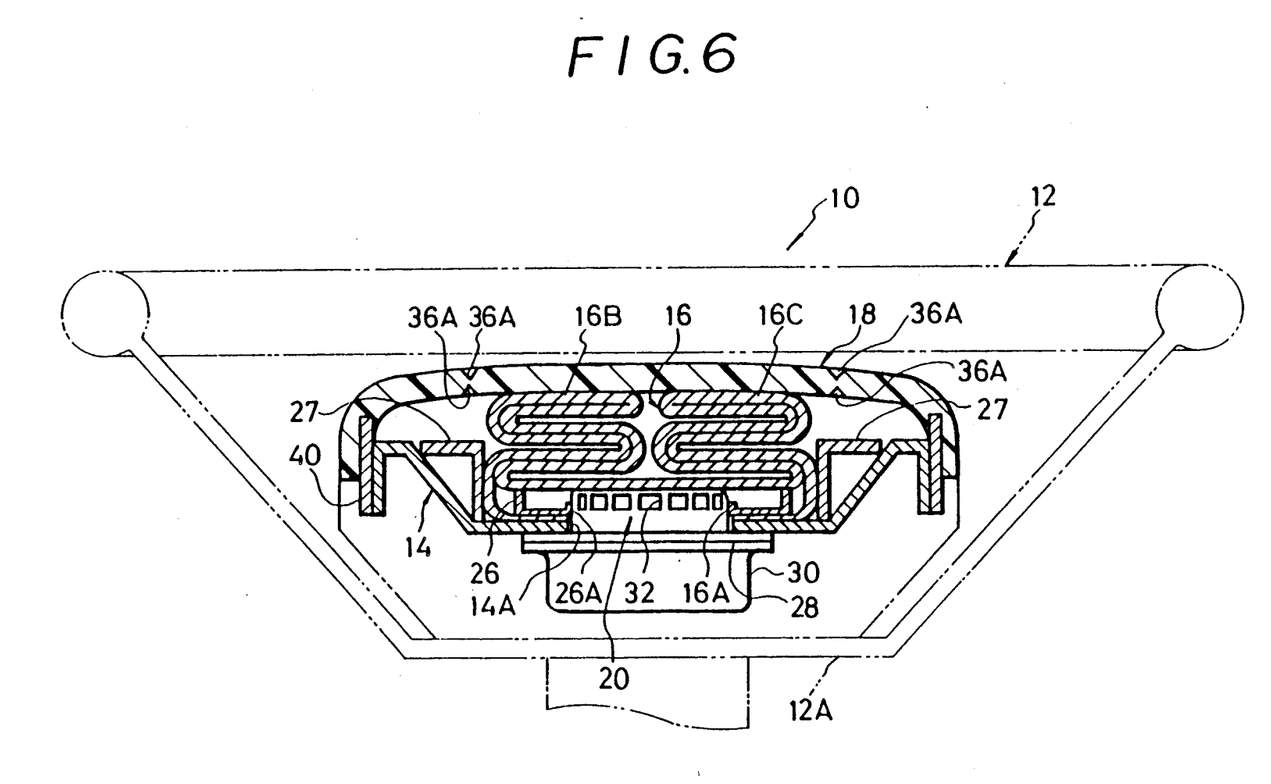
FIG. 6 is a cross-sectional view taken along the line VI—VI of FIG. 1.
Figure 7:
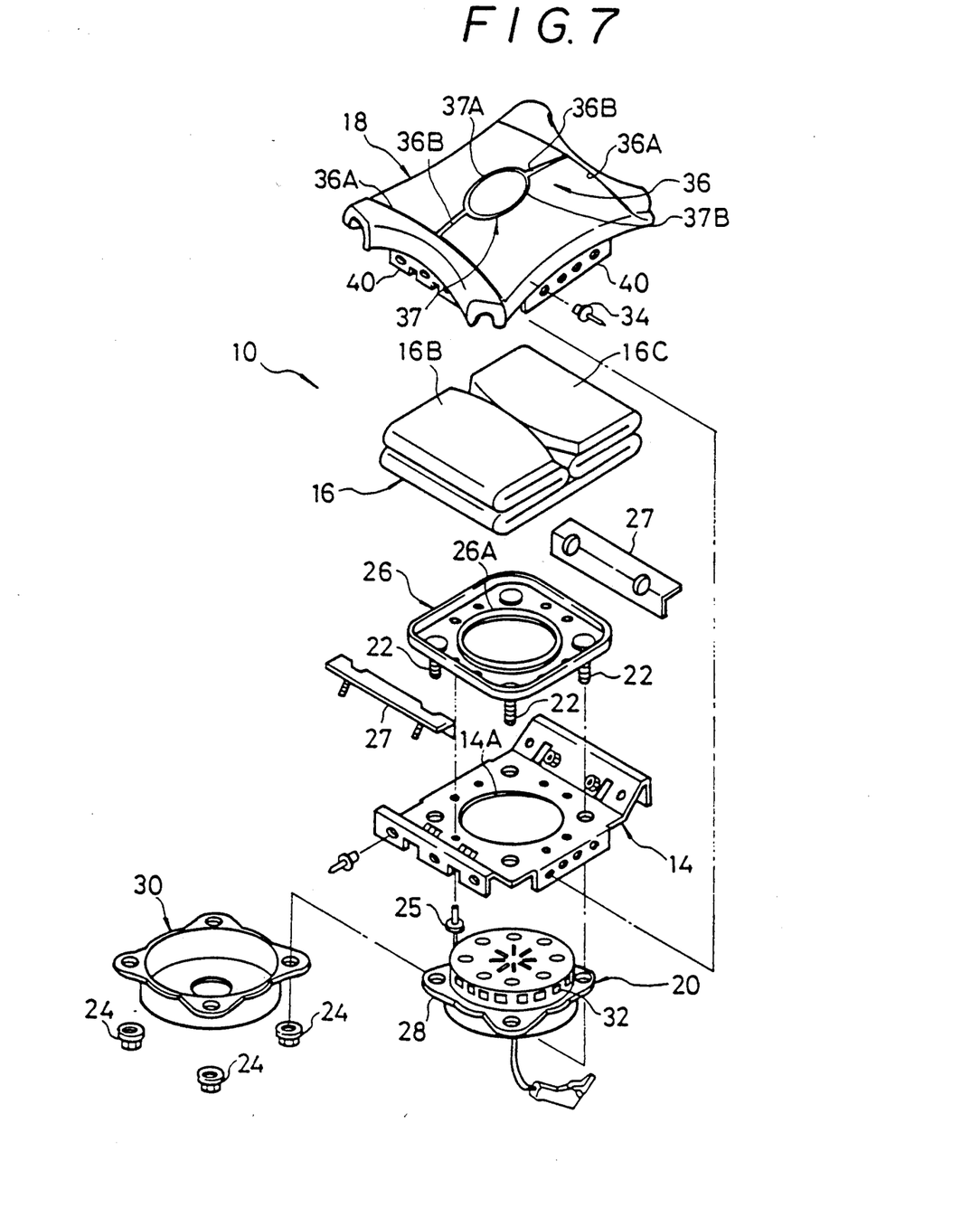
FIG. 7 is an exploded perspective view of FIG. 6.

FIG. 6 is a cross-sectional view illustrating a state in which an air bag apparatus to which the present invention is applied has been assembled to a steering wheel. FIG. 7 shows the air bag apparatus in a dismantled state.

As shown in FIGS. 6 and 7, an air bag 10 is arranged such that a base plate 14 is supported by a hub 12A of a steering wheel 12 through an unillustrated means, and an air bag 16, an air bag cover 18, an inflator 20, and the like are disposed on the base plate 14.

The air bag 16 is accommodated in an upper portion of the base plate 14 in a folded state, and a peripheral portion of its opening 16A is secured to the base plate 14 in close contact therewith by being pressed by a ring plate 26 which is secured to the base plate 14 via bolts 22, nuts 24, and rivets 25. In addition, the folded posture of the air bag 16 is maintained by being held at its opposite sides by a pair of hold plates 27.

The inflator 20 is disposed in such a manner as to be inserted through a through hole 14A provided in a central portion of the base plate 14, the opening 16A of the air bag 16, and a through hole 26A provided in a central portion of the ring plate 26. An upper end portion of the inflator 20 projects inwardly of the air bag 16, and a flange 28 provided on an intermediate portion of its outer periphery is secured to the base plate 14 via the bolts 22 and the nuts 24. In addition, the inflator 20 is accommodated inwardly of an inflator cover 30 secured to the base plate 14 via the bolts 22 and the nuts 24.

The inflator 20 is filled with a gas-generating substance, and the arrangement is such that when the speed of the vehicle equipped with the air bag apparatus is decelerated very suddenly, the deceleration is detected by a sensor to start combustion of the gas-generating substance, whereupon a gas generated is jetted through an opening 32, thereby inflating the air bag 16.

An insert plate 40 located at a lower end portion of the air bag cover 18 is secured to the base plate 14 via rivets 34, and a space defined by the air bag cover 18 and the base plate 14 constitutes a chamber for accommodating the air bag 16.

Figure 1:
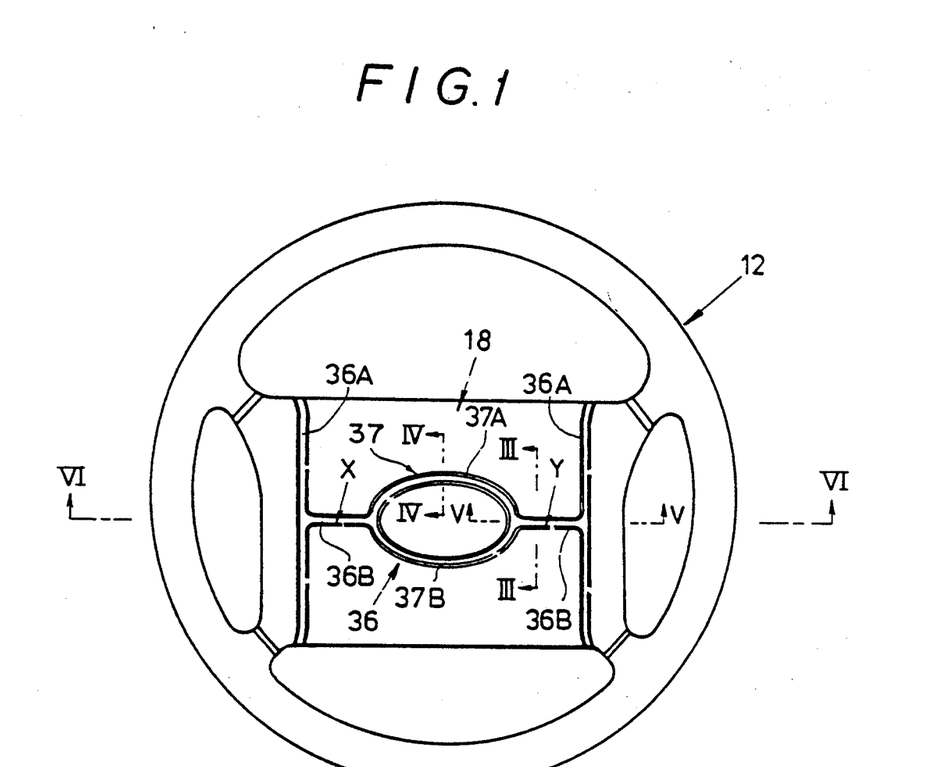
FIG. 1 is a front elevational view illustrating a state in which an air bag cover in accordance with an embodiment of the present invention is mounted on a steering wheel.
Figure 3:
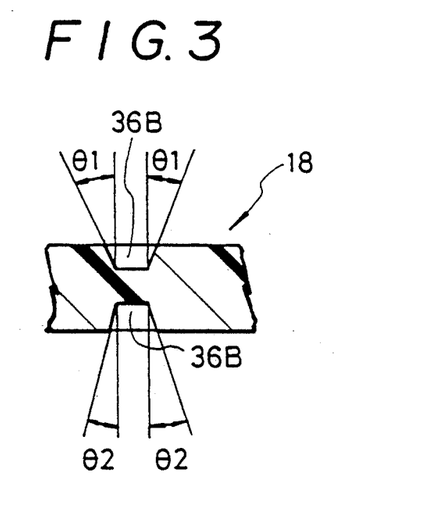
FIG. 3 is a cross-sectional view taken along the line III—III of FIG. 1.
Figure 4:
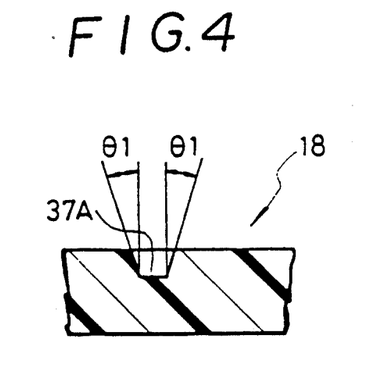
FIG. 4 is a cross-sectional view taken along the line IV—IV of FIG. 1.
Figure 5:
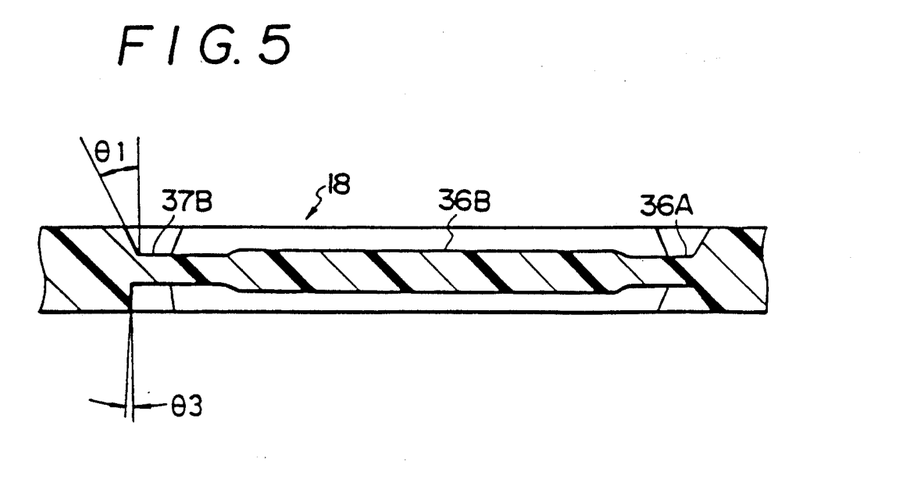
FIG. 5 is a cross-sectional view taken along the line V—V of FIG. 1.

As shown in detail in FIG. 1, a groove portion 36 having a substantially H-shaped configuration as a whole is formed in the surface of the air bag cover 18. This groove portion 36 comprises a pair of vertical grooves 36A as second thin-walled portions, a pair of horizontal grooves 36B as first thin-walled portions, and a loop-shaped groove 37 having the second thin-walled portion formed between the pair of horizontal grooves 36B. The loop-shaped groove 37 comprises an upper groove 37A and a lower groove 37B both having a curved configuration. The lower groove begins or terminates at a position where it is connected to each of the horizontal grooves 36B. In addition, as shown in FIGS. 3 and 5, a pair of vertical grooves 36A and a pair of horizontal grooves 36B are similarly formed in the reverse surface of the air bag cover 18 at positions corresponding to the pair of vertical grooves 36A and the pair of horizontal grooves 36B provided on the obverse surface of the air bag cover 18. However, although a lower groove 37B is also similarly formed in the reverse surface of the air bag cover 18 at a position corresponding to the lower groove 37B, as shown in FIG. 4, an upper groove 37A is not formed in the reverse surface at a position corresponding to the upper groove 37A provided in the obverse surface of the air bag cover 18.

Accordingly, the air bag cover 18 is adapted to open as the horizontal grooves 36B, the vertical grooves 36A, and the lower groove 37B are broken.

As shown in FIG. 5, the thicknesses of those portions of the air bag cover 18 where a portion of the horizontal groove 36B in the vicinity of the loop-shaped groove 37 and a portion of the lower groove 37B of the loop-shaped groove 37 in the vicinity of the horizontal groove 36B (i.e., in the range of L in FIG. 2) are located are made smaller than the thicknesses of those portions of the air bag cover 18 where the remaining portions of the horizontal groove 36B and the lower groove 37B are located. In addition, the thicknesses of those portions of the air bag cover 18 where a portion of the horizontal groove 36B in the vicinity of the vertical groove 36A and a portion of the vertical groove 36A in the vicinity of the horizontal groove 36B (i.e., in the range of M in FIG. 2) are also made smaller than the thicknesses of those portions of the air bag cover 18 where the remaining portions of the horizontal groove 36B and the vertical groove 36A are located.

It should be noted that in this embodiment the vertical grooves 36A, the horizontal grooves 36B, and the loop-shaped groove 37 are provided with inclined side walls, each space formed by the opposing inclined side walls being gradually wider toward its opening. This arrangement facilitates the removal of a mold when the air bag cover 18 is formed by molding. As shown in FIG. 3, the angles $\theta_1$, $\theta_2$ of inclination of the inclined side walls of the horizontal grooves formed in the observe and reverse surfaces of the air bag cover 18 are set to be identical, as shown in FIG. 3.

Meanwhile, as shown in FIG. 4, the angle of inclination of each inclined side wall of the upper groove 37A of the loop-shaped groove 37 is set to be identical with the angle of inclination of the inclined side wall of the horizontal groove 36B. On the other hand, as for the angles of inclination of the inclined side walls (left-hand side walls, as viewed in FIG. 5) of the pair of the lower grooves 37B, the angle $\theta_1$ of inclination of the inclined side wall formed in the obverse surface of the air bag cover 18 is set to be greater than an angle $\theta_3$ of inclination of the inclined side wall formed in the reverse surface of the air bag cover 18.

The operation of this embodiment will be described hereinunder.

When the speed of the vehicle equipped with the air bag apparatus 10 is decelerated very suddenly during running, the inflator 20 causes the air bag 16 to be inflated with a gas generated by the inflator 20. Because of the folded state of the air bag 16, its peripheral portions 16B, 16C are first brought into contact with the air bag cover 18 and press the same. Hence, the air bag cover 18 begins to be pressed at its inner portions corresponding to the peripheral portions 16B, 16C of the air bag 16.

Accordingly, with reference to FIG. 1, maximum strains occur at portions X and Y and their vicinity in the horizontal grooves 36B, and the breakage first occurs at these portions. Then, as the lower groove 37B of the loop-shaped groove 37 and the vertical grooves 36A are broken, the air bag cover 18 breaks open outwardly. As a result, the air bag 16 is made to advance toward the occupant, and the air bag 16 which has advanced is interposed between the steering wheel 12 and the occupant, thereby protecting the occupant.

Figure 2:
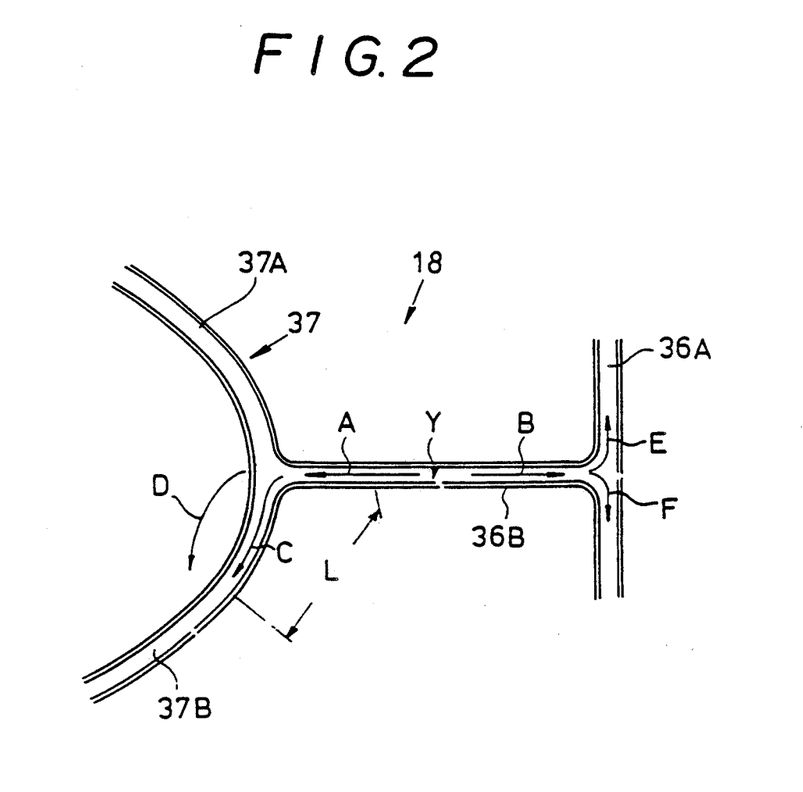
FIG. 2 is an enlarged view illustrating a part of the air bag cover shown in FIG. 1.

With reference to the right-hand portion of FIG. 1, a description will now be given of the state of breakage of the air bag cover 18. When the breakage begins at portion Y and its vicinity in the horizontal groove 36B due to the pressing force exerted by the air bag 16 inflated with the gas generated, tearing forces are exerted from the broken portion in the directions of arrows A and B, as shown in FIG. 2. As a result, adjacent portions of the air bag cover 18 abutting each other along the horizontal groove 36B begin to be torn away from each other along the horizontal groove 36B. In other words, the tearing force advances in the direction of arrow A while tearing the air bag cover 18 along the horizontal groove 36B and tends to advance further in the directions of arrow C and arrow D. However, since the thicknesses of portions of the air bag cover 18 where the lower groove 37B of the loop-shaped groove 37 and the portion of the horizontal groove 36B in the vicinity of the lower groove 37B are located are formed to be smaller than the thicknesses of the portions of the air bag cover 18 where they are not located, a major portion of the tearing force acts in the direction of arrow C.

Accordingly, since the breakage which began at the horizontal groove 26B advances smoothly from the horizontal groove 36B only to the lower groove 37B of the loop-shaped groove 37, no breakage occurs to the portion of the air bag cover 18 surrounded by the loop-shaped groove 37. As a result, the portion of the air bag cover 18 located inwardly of the loop-shaped groove 37 is prevented from being torn off and scattered.

Meanwhile, the tearing force which advanced in the direction of arrow B in FIG. 2 while tearing the air bag cover 18 along the horizontal groove 36B tends to advance in the longitudinal direction of the vertical groove 36A (in the directions of arrows E and F in FIG. 2). Since the thicknesses of the portions of the air bag cover 18 where the horizontal groove 36B and the vertical groove 36A meet each other and in the vicinity of the connecting portion are also formed to be smaller than the thicknesses of the portions thereof where the remaining portions of the horizontal groove 36B and the vertical groove 36A are located, the breakage which has begun from the horizontal groove 36B advances smoothly to the vertical groove 36A.

In addition, since the thickness of the portion of the air bag cover 18 where the lower groove 37B of the loop-shaped groove 37 is located is formed to be small, the air bag cover 18 opens at a stage where the expanding pressure of the air bag 16 is relatively small. Hence, there is the advantage that the sound pressure generated by the opening of the air bag cover 18 can be made small.

It should be noted that when the horn is sounded, the air bag cover 18 is pressed with the overall palm of the hand, so that even if the portions of the air bag cover 18 where the connecting portions between the lower groove 37B of the loop-shaped groove 37 and the horizontal groove 36B and their vicinity are formed are provided with small thicknesses, the durability of the air bag cover 18 does not decline.

In addition, although in the above-described embodiment the vertical grooves 36A, the horizontal grooves 36B, and the lower groove 37B of the loop-shaped groove 37 are formed in both the obverse and reverse surfaces of the air bag cover 18, the vertical grooves 36A, the horizontal grooves 36B, and the loop-shaped groove 37 may be formed in only the reverse surface of the air bag cover 18.

Furthermore, although in the above-described embodiment the substantially H-shaped groove portion 36 is formed in the air bag cover 18, the configuration of the groove portion 36 is not confined to the same.

What is claimed is:

1. An air bag cover which is used for an air bag apparatus having a bag adapted to be inflated in front of a seat occupant at a sudden deceleration of the vehicle speed and which covers said bag in a folded state, said air bag cover comprising:
    a cover body having a predetermined thickness for covering said bag in the folded state;
    a first thin-walled portion which is provided in a portion of said cover body and is adapted to break at the time of the expansion of said bag so as to permit said bag to expand toward the seat occupant;
    a second thin-walled portion which is formed continuously with said first thin-walled portion and whose longitudinal direction differs from that of said first thin-walled portion; and
    a third thin-walled portion provided in a portion connecting together said first and second thin-walled portions and having a smaller thickness than those of said first and second thin-walled portions.

2. An air bag cover according to claim 1, wherein each of said thin-walled portions is formed by providing a pair of grooves, respectively, in obverse and reverse surfaces of said cover body.

3. An air bag cover according to claim 1, wherein a pair of said second thin-walled portions are provided, and said first thin-walled portion is interposed between and connected to said second thin-walled portions 4. An air bag cover according to claim 1, wherein said third thin-walled portion includes an end of said first thin-walled portion and an end of said second thin-walled portion.

5. An air bag cover according to claim 1, wherein the longitudinal direction of said first thin-walled portion and that of said second thin-walled portion are substantially perpendicular to each other.

6. An air bag cover according to claim 1, wherein said second thin-walled portion is formed into an annular configuration in a substantially central portion of said cover body.

7. An air bag cover according to claim 6, wherein said first thin-walled portion extends from a portion of said annular second thin-walled portion in a direction of moving away from said second thin-walled portion.

8. An air bag cover according to claim 6, wherein at least a pair of said first thin-walled portions are provided respectively extending radially from opposite sides of said annular second thin-walled portion.

9. An air bag cover according to claim 8, wherein one semicircular portion of said annular second thin-walled portion located between said pair of first thin-walled portions is provided with a small thickness by forming a groove portion in one surface of said cover body, while the other semicircular portion of said annular second thin-walled portion is provided with a small thickness by forming a pair of groove portions, respectively, in obverse and reverse surfaces of said cover body.

10. An air bag cover according to claim 8, wherein an end of one of said first thin-walled portions which is opposite to the end which is connected to said second thin-walled portion is connected to another second thin-walled portion.

11. An air bag cover according to claim 10, wherein opposite ends of said another second thin-walled portion lead to ends of said cover body.

12. An air bag cover according to claim 11, wherein said first thin-walled portion is formed perpendicular to an intermediate portion of said another second thin-walled portion.

13. An air bag cover which covers a bag in a folded state and a part of which is adapted to break at the time of the expansion of said bag so as to permit the expansion of said bag, said air bag cover comprising:
    an elongated first thin-walled portion which is adapted to break by the pressure of said bag at the time of the expansion of said bag so as to form an outlet port for said bag;
    an elongated second thin-walled portion which is connected to an end of said first thin-walled portion substantially perpendicularly thereto and is adapted to further expand said outlet port for said bag; and a third thin-walled portion which is provided at a connecting portion between said first thin-walled portion and said second thin-walled portion and is provided with an even smaller thickness than those of said first and second thin-walled portions.

14. An air bag cover according to claim 13, wherein each of said thin-walled portions is formed by providing a pair of grooves, respectively, in obverse and reverse surfaces thereof.

15. An air bag cover according to claim 13, wherein the longitudinal direction of said first thin-walled portion is rectilinear, while that of said second thin-walled portion is curvilinear.

16. An air bag cover according to claim 13, wherein said second thin-walled portion is formed into an annular configuration in a central portion of said air bag cover, a portion of said air bag cover located inwardly of said annular second thin-walled portion constituting an ornamental display portion.

17. An air bag cover according to claim 16, only a portion of said annular second thin-walled portion constitutes a portion to be broken.

18. An air bag cover which covers a folded bag accommodated in a base member mounted on a chassis of a vehicle and which is secured to a base plate, said air bag cover comprising:

a cover body a peripheral portion of which is secured to said base member;

a first thin-walled portion which is formed by providing a pair of grooves, respectively, in both obverse and reverse surfaces of said cover body, said first thin-walled portion being adapted to break at the time of the expansion of said bag so as to permit the expansion of said bag and protrusion thereof from said cover body;

an arc shaped second thin-walled portion formed in a central portion of said cover body and connected at an end portion thereof to said first thin-walled portion substantially perpendicular to the same, thereby allowing the breakage of said first thin-walled portion to advance to said second thin-walled portion so as to further expand a portion to be broken; and a third thin-walled portion provided at a connecting portion between said first thin walled portion and said second thin-walled portion and having an even smaller thickness than the thicknesses of said first and second thin-walled portions.

19. An air bag cover according to claim 18, wherein said second thin-walled portion is formed by providing an annular groove in an obverse surface of said cover body and by providing a groove in a reverse surface of said cover body at a position corresponding to a portion of said annular groove, wherein the portion of said cover body where said grooves are respectively formed in said obverse and reverse surfaces of said cover body constitutes a portion to be broken.

20. An air bag cover according to claim 18, wherein a pair of said first thin-walled portions are respectively formed on opposite sides of said second thin-walled portion, said first thin-walled portions being formed into a longtitudinally rectilinear configuration, and said second groove being formed into a longitudinally curvilinear.

* * * * *